Figure 1:
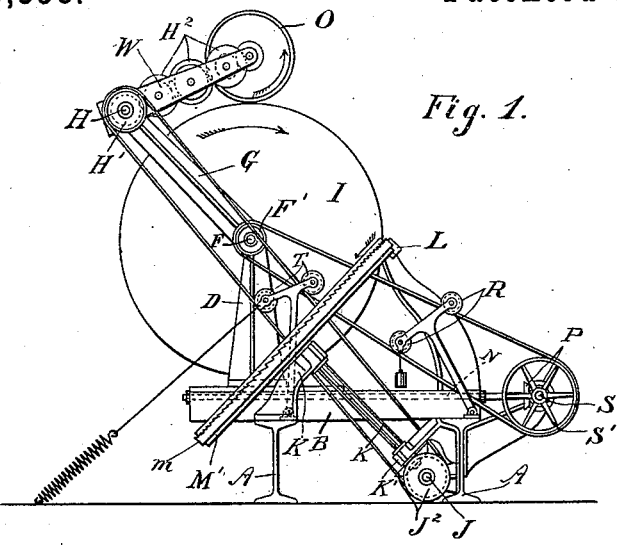

(No Model.) 2 Sheets—Sheet 1.

J. E. GOODWIN.
MACHINE FOR MAKING EXCELSIOR AND MATERIAL FOR WOOD PULP FOR PAPER MAKING.

No. 350,358. Patented Oct. 5, 1886.

WITNESSES:

INVENTOR
Jno. E. Goodwin
BY W. G. Rainey
ATTORNEY.

(No Model.)  2 Sheets—Sheet 2.

J. E. GOODWIN.
MACHINE FOR MAKING EXCELSIOR AND MATERIAL FOR WOOD PULP FOR PAPER MAKING.

No. 350,358. Patented Oct. 5, 1886.

WITNESSES:

INVENTOR
Jno E. Goodwin
BY W. G. Rainey
ATTORNEY.

UNITED STATES PATENT OFFICE.

JOHN E. GOODWIN, OF MEMPHIS, TENNESSEE.

MACHINE FOR MAKING EXCELSIOR AND MATERIAL FOR WOOD PULP FOR PAPER-MAKING.

SPECIFICATION forming part of Letters Patent No. 350,358, dated October 5, 1886.

Application filed December 11, 1885. Serial No. 185,400. (No model.)

*To all whom it may concern:*

Be it known that I, JOHN E. GOODWIN, of Memphis, in the county of Shelby and State of Tennessee, have invented a new and useful Improvement in Machines for Making Excelsior and Material for Wood Pulp for Making Paper, which improvement is fully set forth in the following specification and accompanying drawings.

The object of my invention is to devise a new machine to make excelsior and material for wood pulp under a method or process also invented by me, and particularly set forth and described in my application for a patent filed contemporaneously herewith, and the chief feature of which is to present the revolving surface of a bolt or log of wood from which the excelsior or fiber for making wood pulp is to be made to the cutting-edge of a saw having the direction of its motion at right angles with the direction in which the bolt is revolved, and lengthwise with respect to the grain or fiber of the timber. The angle that the cutting-edge of the saw presents to the surface of the timber may be varied, but is more efficient at, say, forty-five degrees variation from the radial line of the bolt, and while the direction of the motion of the saw is always at a right angle to the direction of the motion of the timber or lathe in which it is being revolved, the position of the saw may be either horizontal, vertical, or oblique, and if horizontal the cutting-edge or teeth may be turned upward or downward, as may be best calculated to secure the grade or kind of fiber wanted.

It is well known that all kinds of wood grow concentrically, or from within outwardly, by rings, added yearly, with the fiber running perpendicularly as the tree grows upward, having a tendency to be in a spiral line or helicoid. It is also well known that if wood be lying horizontal and moved horizontally while being sawed by a saw perpendicularly with or across the grain or fiber sawdust will be produced. This is specially the case when a muley or circular saw is used. Should a band-saw be used when sawing longitudinally with the grain when making a kerf or slit some of the cutting will be fibrous; but when the band-saw is made to run lengthwise and parallel as it lies horizontally (making no kerf or slit) the cutting will be almost entirely of a fibrous nature.

In my invention the saw is designed not to make a kerf, but it is designed to cut out or gin the fiber without cutting a kerf or slit into the timber, thereby reducing to a minimum the chance of destroying the wood-cells. I design to drive the saw lengthwise the timber, the motion of the saw being parallel, or as nearly so as may be, with the grain of the timber, the timber revolving at right angles to the motion of the saw. It is obvious that when the saw is so used (the timber being revolved at right angles to its motion) the saw will cut the timber on the line of and nearly parallel to the growth of the fiber and somewhat in a spiral or helicoid line, and consequently cut the greatest possible percentage of excelsior or fiber for making wood pulp, or such other purposes as the demands of commerce may find it available, in fact, ginning out or extracting the actual fiber of the timber entirely, the only loss being that small percentage of wood which is not of a fibrous nature and which goes to sawdust.

I prefer a band-saw, but do not wish to be confined to a band-saw, as similar results may be produced, but in an inferior degree, by using an endless belt or link-belt armed with teeth or chisels, or any equivalent device.

Figure 2:
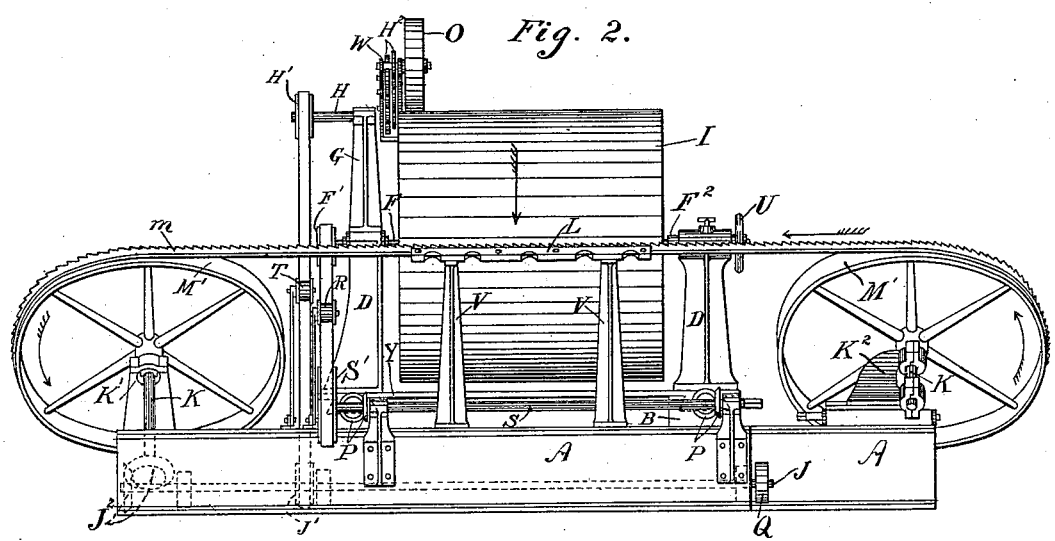
Figure 3:
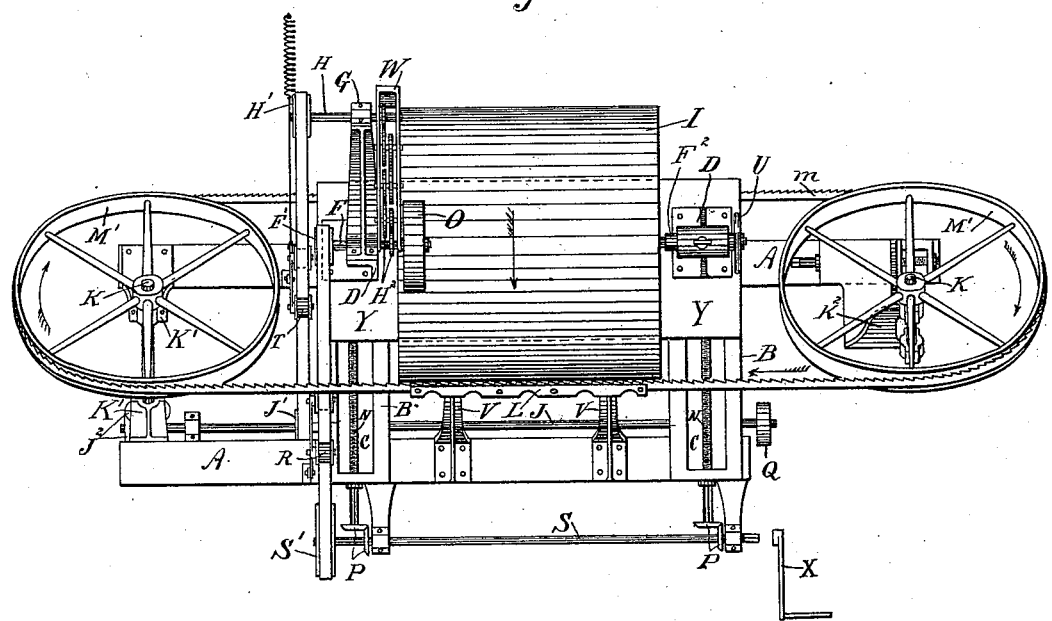
Figure 4:
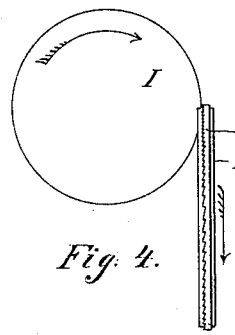
Figure 6:
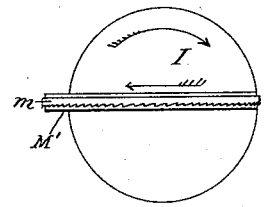
Figure 5:
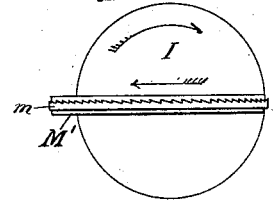

Referring to the accompanying drawings, Figure 1 represents an end view of my machine. Fig. 2 represents a front view of the same; Fig. 3, a plan view of the same. Figs. 4, 5, and 6 show modifications in the relative positions of the saw and the timber, the saw being shown as either vertical, horizontal with the teeth turned upward, and horizontal with the teeth turned downward, in each figure, respectively.

A A are I-beams, on which rests the bed-plate B, which constitutes the frame. The construction of this frame may be varied without departing from the character of the invention, the object being to make it strong, convenient, and durable. D D are upright brackets or bearings joined together by the plate Y, and arranged to slide in the grooved ways C C, as they are drawn up to or driven back from the saw by the screws N N. F' F² are spindles operated in the bearings of the brackets D D. F has set-collars to prevent lateral motion, and by the indentation of its center gains a purchase into the log or bolt I, and so is revolved as the log is. F² is adjustable in its bearings by a screw and hand-wheel, U, to permit timbers of varying length to be worked. I is the log or bolt held between centers of the spindles F F². G is an arm of the bracket D, for the purpose of supplying a suitable bearing for the journal H', from which is suspended the swinging frame or yoke W, and carrying the gear-wheels H², of suitable diameters and powers to drive the friction-pulley O at the proper speed. This frame with its various wheels should be heavy enough to furnish sufficient power or traction to the pulley O as it bears upon the log or bolt I, and follows it down as it is reduced, in order to drive it efficiently against the teeth of the saw. T is an idler to hold taut the belt driven by the pulley J' over the pulley H', and take up the slack as the lathe is advanced. H' and J' may be cone-pulleys. S is the shaft driven by the bolt running from the driving-pulley F' over the driven pulley S', and held taut by the idler R as the lathe is moved in the grooves C C. This shaft carries bevel-geared wheels P P, by which the screws N N are actuated. X is a crank, by which the bearings D D and their load may be drawn to or driven back by the screws N N while the machine is not in motion. These details constitute the lathe.

K K are the shafts, upon which are driven the pulleys M' M'. They have their proper bearings K' K², and the bearing K² on the shaft of the driven pulley M' is adjustable by a screw to take up the slack of the saw and maintain a proper tension. The band-saw m is driven over the pulleys M' M', and has a guide-bar, L, with slotted groove, and wheels for guiding the saw, and it is supported by upright arms V. J is a shaft carrying the bevel-geared wheels J², by which the shafts K K are driven. Q is the main driving-pulley. These details constitute the band-saw.

The machine being driven by the belt from the line or counter-shaft working over the pulley Q, motion is conveyed to the saw by the bevel-gears J², and to the lathe by the belt driven from the pulley J' over the pulley H'; thence by the shaft H to the gears H², driving the friction-pulley O. Now, the relation that the diameter of the pulley O bears to the diameter of the log I determines the speed of the revolutions of the log or bolt I, and compels its surface-travel to be unvarying and continuous, while at the centers F and F² the speed increases as the diameter of the log or bolt I is diminished by its contact with the saw m. The pulley F² conveys this gradual increase of speed to the shaft S, and through the gears P P to the screws N N, by which the feed is accelerated as the log or bolt is pared away. The same area of working-surface is thus presented to the saw without intermission and a uniform product secured.

The saw may be driven at any desired speed within the range of mechanical practicability, and the lathe may be revolved as slowly as desired, even so much so as to be scarcely perceptible, and the relative speeds of the lathe and the saw may be varied, as desired, indefinitely, and the variations of these speeds determined to suit the quality of fiber wanted as fine or coarse.

Having thus described my invention, what I claim as new, and desire to secure by Letters Patent, is—

1. In a machine for making excelsior or material for wood pulp and kindred products from wood fiber, the combination of a saw which has its line of motion at right angles to the line of motion of a lathe designed to hold the wood, and the mechanism for operating the saw and lathe, substantially as and for the purposes set forth.

2. In a machine for making excelsior material for wood pulp and kindred products from the fiber of wood, the combination of a frame, guideways therefor running transversely of said frame, of a lathe and a bed-plate therefor on a screw actuating said bed-plate, and a saw adapted to run at right angles to the line of motion of the lathe, substantially as described and set forth.

3. In a machine for making excelsior material for wood pulp and kindred products from the fiber of wood, the combination of a frame, such as described, a band-saw or its equivalent, a lathe, substantially as described, designed to have its line of motion at right angles with the line of motion of the saw, and the mechanism for operating the same, substantially as set forth, and in the manner described.

4. The combination of a frame, as described, upright brackets D, guideways C, saw in pulleys M', lathe, as described, with its mechanism for revolving the same, in combination with the saw, for the purposes and in the manner set forth, and the friction-pulley O with its intermediate gear-wheels, H², yoke W, and arm G.

5. In a machine for producing excelsior and paper-making pulp from the fiber of wood, the combination of a frame, a lathe, substantially as described, a band-saw, and mechanism, substantially as described, for operating the same in connection with the lathe, as set forth.

JOHN E. GOODWIN.

Witnesses:
JAS. MORRISON,
B. F. FIELDS, Jr.